United States Patent
Bhatt et al.

(10) Patent No.: US 10,754,320 B2
(45) Date of Patent: Aug. 25, 2020

(54) METHOD AND APPARATUS FOR INTEGRATING AN EXTERNAL MOTION PLANNER WITH AN INDUSTRIAL CONTROLLER

(71) Applicant: Rockwell Automation Technologies, Inc., Mayfield Heights, OH (US)

(72) Inventors: Jatin P. Bhatt, Highland Heights, OH (US); Rahul Sharma, Chagrin Falls, OH (US); Shipei Tian, Mayfield Heights, OH (US); Robert B. Hirschinger, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 21 days.

(21) Appl. No.: 16/188,478

(22) Filed: Nov. 13, 2018

(65) Prior Publication Data

US 2019/0146451 A1  May 16, 2019

Related U.S. Application Data

(60) Provisional application No. 62/585,936, filed on Nov. 14, 2017.

(51) Int. Cl.
*G05B 19/19* (2006.01)

(52) U.S. Cl.
CPC .... *G05B 19/19* (2013.01); *G05B 2219/40519* (2013.01)

(58) Field of Classification Search
None
See application file for complete search history.

(56) References Cited

U.S. PATENT DOCUMENTS 4,038,533 A * 7/1977 Dummermuth .... G05B 19/4147
700/7
4,786,847 A * 11/1988 Daggett ................ B25J 9/1633
318/568.2

(Continued)

OTHER PUBLICATIONS

B&R Industrial Automation GmbH; MAJAtronic Article from Integrated Robotics 4.0 Customer Magazine, Sep. 2018—(9) pages.

(Continued)

*Primary Examiner* — Jason Lin
(74) *Attorney, Agent, or Firm* — Boyle Fredrickson, SC

(57) ABSTRACT

An industrial controller that integrates with an external controller for improved control of an industrial machine or process and for coordinating internal motion control functions of the industrial controller with the control routines native to the external controller is disclosed. The industrial controller includes one or more internal motion control instructions, such as a jog, cam, follower, or gearing function. The industrial controller further includes an internal motion planner to generate commands for motor drives connected to the industrial controller to execute the internal motion control instructions or user provided motion control instructions in a control program. External vendors have also developed motion planners to generate motion commands, for example, for the axes on robotic equipment. The present invention includes an interface between motion commands and motor drives controlled by the industrial controller and the external motion planners to seamlessly integrate the external motion planner with the industrial controller.

19 Claims, 7 Drawing Sheets

(56) References Cited

U.S. PATENT DOCUMENTS

| | | | | |
|---|---|---|---|---|
| 5,162,986 | A * | 11/1992 | Graber | G05B 19/052 |
| | | | | 700/17 |
| 5,485,620 | A * | 1/1996 | Sadre | G05B 19/41865 |
| | | | | 700/18 |
| 6,297,610 | B1 * | 10/2001 | Bauer | G05B 11/32 |
| | | | | 318/562 |
| 7,738,977 | B2 * | 6/2010 | Weinhofer | G05B 19/06 |
| | | | | 318/578 |
| 2005/0067995 | A1 * | 3/2005 | Weinhofer | B25J 9/1664 |
| | | | | 318/574 |
| 2007/0010898 | A1 * | 1/2007 | Hosek | G05B 19/4185 |
| | | | | 700/2 |
| 2007/0013328 | A1 * | 1/2007 | Shemm | H02K 41/031 |
| | | | | 318/135 |
| 2012/0256566 | A1 * | 10/2012 | Chaffee | G05B 15/02 |
| | | | | 318/34 |
| 2015/0066400 | A1 * | 3/2015 | Schmidt | H02P 6/34 |
| | | | | 702/60 |
| 2016/0098025 | A1 * | 4/2016 | Mansouri | G05B 17/02 |
| | | | | 700/29 |
| 2017/0212494 | A1 * | 7/2017 | Bhatt | G05B 19/19 |
| 2017/0315517 | A1 * | 11/2017 | da Silva | G05B 13/041 |

OTHER PUBLICATIONS

Keba; Kemotion Brochure—(40) pages; downloaded Sep. 26, 2018 from www.keba.com/web/downloads/industrial-automation/brochures/KeMotion_Brochure_EN.pdf.

* cited by examiner

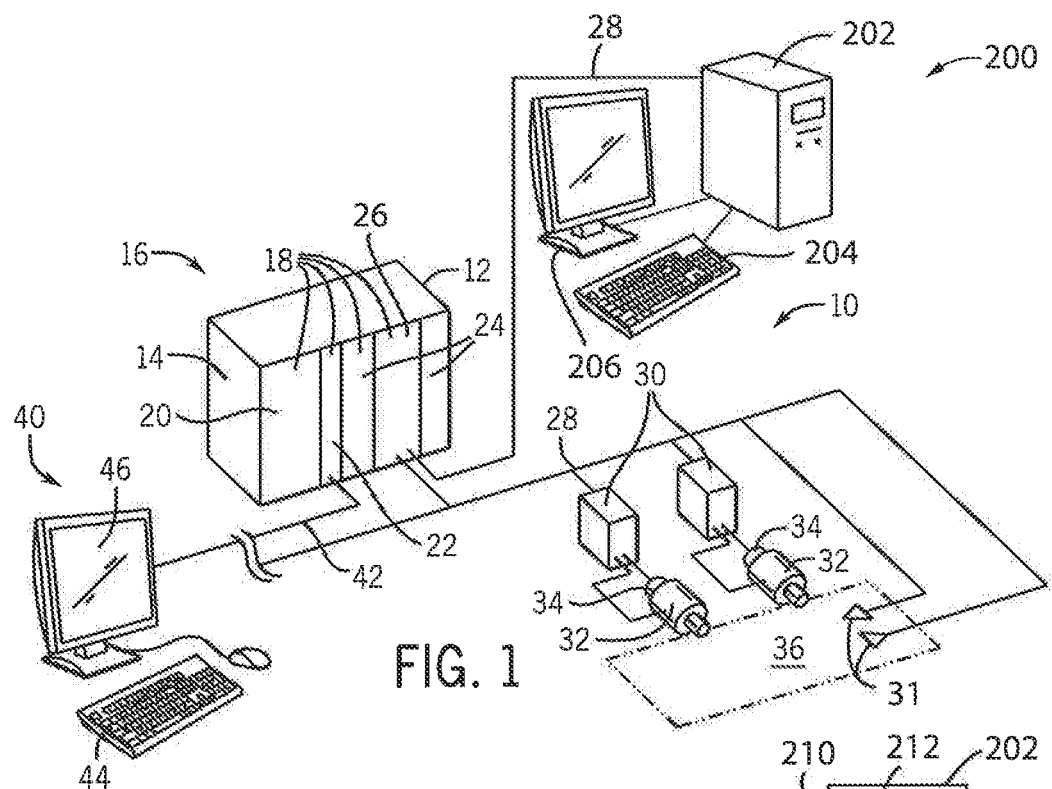
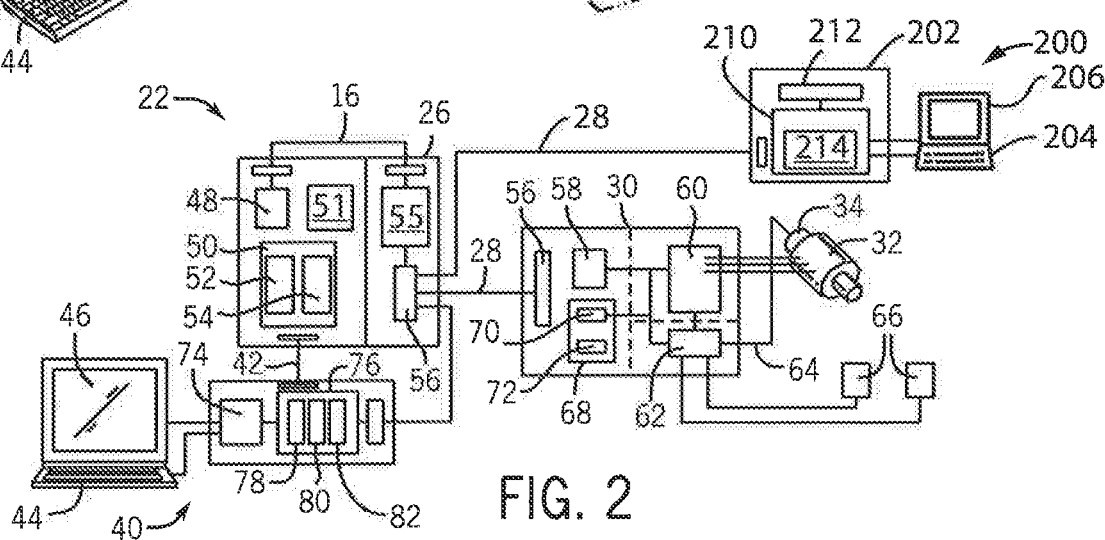
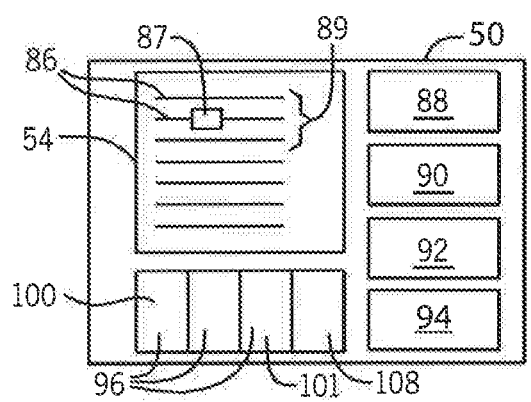

METHOD AND APPARATUS FOR INTEGRATING AN EXTERNAL MOTION PLANNER WITH AN INDUSTRIAL CONTROLLER

CROSS-REFERENCE TO RELATED APPLICATIONS

This application claims priority to U.S. Provisional Application Ser. No. 62/585,936, filed Nov. 14, 2017, the entire contents of which is incorporated herein by reference.

BACKGROUND INFORMATION

The subject matter disclosed herein relates to industrial control systems for controlling the position and/or velocity of electric motors in real time and in particular to an industrial controller allowing an external motion planner interface with the industrial controller to generate commands for motor drives connected to the industrial controller to control the position and/or velocity of the electric motors.

Industrial controllers are specialized computer systems used for the control of industrial processes or machinery, for example, in a factory environment. Generally, an industrial controller executes a stored control program that reads inputs from a variety of sensors associated with the controlled process or machine and, sensing the conditions of the process or machine and based on those inputs and a stored control program, calculates a set of outputs used to control actuators controlling the process or machine. Special control languages, such as "relay ladder logic" are normally used to facilitate programming of the device. Under the direction of the stored program, a processor of the industrial controller periodically examines the state of input devices and updates the state of output devices. In order to ensure predictable control of a machine or process, the control program must be highly reliable and deterministic, that is, executing at well-defined time periods.

Industrial controllers differ from conventional computers in a number of ways. Physically, they are constructed to be substantially more robust against shock and damage and to better resist external contaminants and extreme environmental conditions than conventional computers. The processors and operating systems are optimized for real-time control and are programmed with languages designed to permit rapid development of control programs tailored to a constantly varying set of machine control or process control applications.

Motor drives are utilized to control operation of a motor. According to one common configuration, a motor drive includes a DC bus having a DC voltage of suitable magnitude from which an AC voltage may be generated and provided to the motor. The DC voltage may be provided as an input to the motor drive or, alternately, the motor drive may include a rectifier section which converts an AC voltage input to the DC voltage present on the DC bus. The motor drive includes power electronic switching devices, such as insulated gate bipolar transistors (IGBTs), thyristors, or silicon-controlled rectifiers (SCRs). A controller in the motor drive generates switching signals to selectively turn on or off each switching device to generate a desired DC voltage on the DC bus or a desired motor voltage.

The motor drive receives a command signal which indicates the desired operation of the motor. The command signal may be a desired position, speed, or torque at which the motor is to operate. The motor is connected to the output terminals of the motor drive, and the controller generates the switching signals to rapidly switch the switching devices on and off at a predetermined switching frequency and, thereby, alternately connects or disconnects the DC bus to the output terminals and, in turn, to the stator of the motor. The position, speed, and torque of the motor are controlled by varying the amplitude and frequency of the AC voltage applied to the stator. By varying the duration during each switching period for which the output terminal of the motor drive is connected to the DC voltage, the magnitude and/or frequency of the output voltage is varied. The motor controller utilizes modulation techniques such as pulse width modulation (PWM) to control the switching and to synthesize waveforms having desired amplitudes and frequencies.

In certain applications, the command signal for the motor drive may be generated by the industrial controller, such as a programmable logic controller (PLC) or a programmable automation controller (PAC). As discussed above, the industrial controller is configured to execute a control program to control operation of an industrial machine or process. Within the control program, certain instructions may be configured to generate a command to the motor. Optionally, the industrial control may include a motion profile generator routine executing within the processor module or may further include a dedicated servo control module generating commands to the motor. Further, the industrial machine or process may include multiple motors and multiple motor drives to control the motors. The motion control instructions in the control program may generate commands to each motor and/or multiple servo control modules may be provided, where each servo control module corresponds to one of the motors. The industrial controller receives feedback signals from sensors on the controlled machine or process corresponding to the present operating state of the motors and of the controlled process and generates output signals with the control program to actuators and to the motor drives as a function of the feedback signals to achieve a desired operation of the controlled machine or process.

In other applications, a separate controller is provided to generate commands for each motor. In a robotic application, for example, the robot may include three axes, six axes, or various other numbers of axes that require synchronized control. The manufacturer of the robot provides a dedicated external controller to generate motion profiles for each axis based on desired movement of the robot and, in turn, converts the motion profile for each axis into a command for the motor, where the command may be a position reference, a velocity reference, a torque reference, or the like. The robot, however, must operate in coordination with the industrial machine or process controlled by the industrial controller. Knowledge of the actions of the robot, therefore, must be provided to the industrial controller.

Historically, the industrial controller would execute the control program until it encountered an instruction requiring action by the robot. The industrial controller would generate an output signal to the dedicated external controller indicating the required action. While the industrial controller may continue controlling other segments of the controlled machine or process, it must wait on a return signal from the dedicated controller indicating that the required action has been completed. The separate controllers limit integration of the robot with the controlled machine or process.

Thus, it would be desirable to provide an industrial controller that is able to integrate with an external controller for improved control of an industrial machine or process.

Additionally, a separate external controller responsible for controlling motion of certain axes in a controlled machine or process, inhibits integration with existing control features of the industrial controller. The industrial controller includes, for example, motion control routines for jogging an axis, for generating a cam profile for motion of one or more axes, or for linking motion of one axis to another axis either in a leader/follower configuration or with a gearing function. With the external controller generating commands for the motor drives, the industrial controller is restricted in utilizing its own motion control features with those axes.

Thus, it would be desirable to provide an improved system for integrating external motion control function with internal motion control functions on an industrial controller.

BRIEF DESCRIPTION

The subject matter disclosed herein describes an industrial controller that integrates with an external controller for improved control of an industrial machine or process and for coordinating internal motion control functions of the industrial controller with the control routines native to the external controller. Typically, an industrial controller includes one or more internal motion control instructions, such as a jog function, a cam function, a follower function, a gearing function, or the like. The industrial controller may further include an internal motion planner to generate commands for motor drives connected to the industrial controller to execute the internal motion control instructions or to execute user provided motion control instructions in a control program. In addition, third party vendors of, for example, robotic equipment have developed motion planners to generate motion commands for the axes on the robotic equipment. The present invention includes an interface between motion commands and motor drives controlled by the industrial controller and the third-party motion planners to seamlessly integrate the third-party motion planner with the industrial controller.

According to one embodiment of the invention, an industrial controller for coordinating motion of multiple axes on a controlled machine or process is disclosed. The industrial controller includes a memory device storing multiple instructions and a processor configured to execute the instructions. A control program executes on the processor, and the control program includes at least one motion instruction defining a motion profile. An inter-processor interface is configured to communicate the motion profile between the industrial controller and an external motion planner and to receive from the external motion planner a series of motion data for controlling operation of at least one motor drive. Each motor drive corresponds to one of the axes on the controlled machine or process. A motion state machine defines multiple states for coordinated motion between the at least one motor drive and the controlled machine or process, and an internal motion planner is configured to select one of the states in the motion state machine as a function of the series of motion data and of at least one additional command corresponding to a desired operation of the controlled machine or process.

According to another embodiment of the invention, a method of coordinating motion of multiple axes on a controlled machine or process is disclosed. A motion instruction is executed by a control program on a processor of an industrial controller. A motion profile defined in the motion instruction is read with an inter-processor interface in the industrial controller. The motion profile is transmitted from the industrial controller to an external motion planner, and a series of motion data for controlling at least one motor drive is received from the external motion planner at the inter-processor interface. Each motor drive corresponds to one of the axes on the controlled machine or process. An internal motion planner selects one of the states defined for coordinated motion between the motor drive and the controlled machine or process, where the internal motion planner is configured to execute on the industrial controller.

According to still another embodiment of the invention, a system for coordinating motion of multiple axes on a controlled machine or process includes at least one motor drive, an external motion planner, and an industrial controller. Each motor drive corresponds to one of the axes on the controlled machine or process. The external motion planner includes a memory configured to store a plurality of instructions to generate a series of motion data and a processor configured to execute the plurality of instructions. The industrial controller includes a processor, a memory device, an inter-processor interface, a motion state machine, and an internal motion planner. The memory device is configured to store a control program, and the processor is configured to execute the control program. The control program includes at least one motion instruction defining a motion profile. The inter-processor interface is configured to communicate the motion profile between the industrial controller and the external motion planner and to receive from the external motion planner the series of motion data. The motion state machine defines multiple states for coordinated motion between the at least one motor drive and the controlled machine or process, and the internal motion planner is configured to select one of the states in the motion state machine as a function of the series of motion data and of at least one additional input corresponding to a desired operation of the controlled machine or process.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 1 is a simplified perspective view of an exemplary industrial control system having an industrial controller communicating with multiple remote motor drives over a communication network and further illustrating an external motion planner connected to the industrial controller;

FIG. 2 is a block diagram of the components of the industrial control system of FIG. 1 showing multiple interacting processors of various components executing stored programs in a distributed fashion;

FIG. 3 is a block diagram representation of a control program and data structures used by the industrial controller of FIG. 1;

Figure 4:
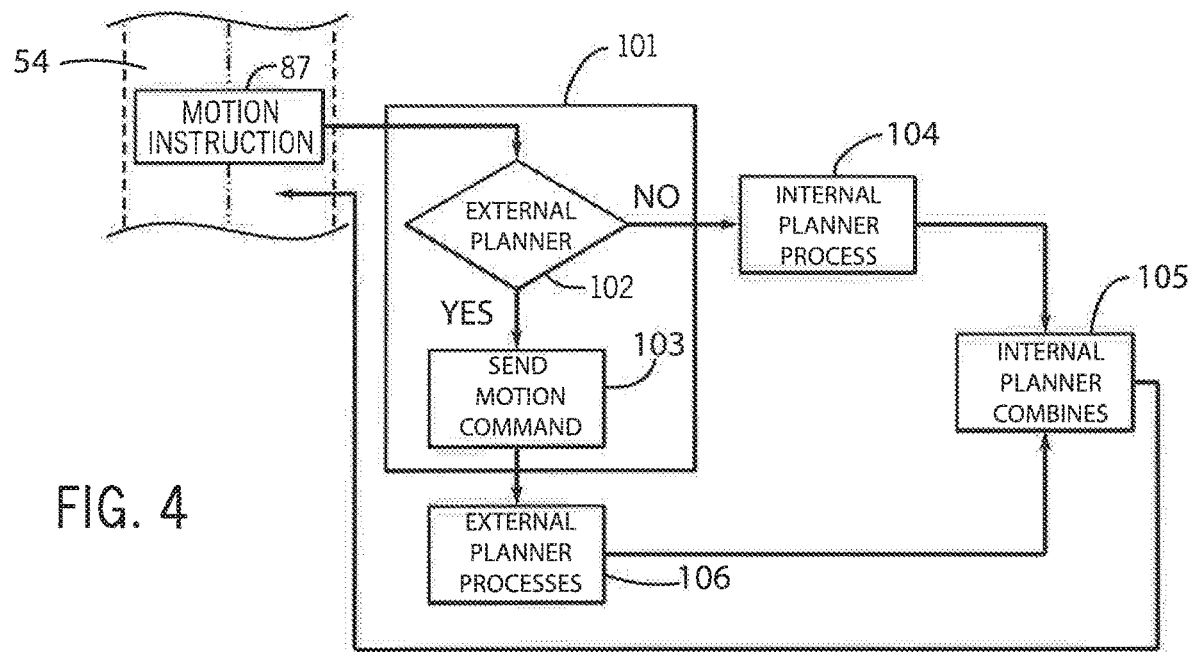
FIG. 4 is a flowchart showing selection of a motion planner by the industrial controller of FIG. 1.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an industrial control system 10 may include an industrial controller 12 providing generally a chassis 14 having a bus 16, such as a backplane, providing intercommunication between multiple modules 18 installed in the chassis 14. The modules may include, for example, a power supply module 20, a processor module 22, one or more I/O modules 24, and the network module 26. The network module 26, or the processor module 22, may communicate on an industrial control network 28 of a type providing connected messaging providing assurances of message completion time, low latency, and lost message detection, for example, ControlNet or EtherNet/IP, well-known open standards.

The industrial control network 28 may join the industrial controller 12 to remote I/O modules (not shown) and one or more remote motor drives 30, the latter which may communicate with corresponding electric motors 32 and position sensors 34 to provide for controlled motion of the electric motors 32 and thereby to control an associated industrial machine or process 36. Each motion for the controlled machine or process 36 is also referred to herein as an axis of motion. For example, a machine that moves in three directions (e.g., up/down, forward/reverse, left/right) has three axes. The axes are often referred to in the coordinate system in which the machine or process 36 is controlled. Therefore, for a machine or process controlled in the Cartesian Coordinate System, the axes may be referred to as an "X" axis, a "Y" axis, and a "Z" axis. Auxiliary axes may also exist for devices such as tool changers, pallet changers, spindles, and the like that interact with the primary axes. Further, each axis may be driven by a single motor 32 or multiple motors operating in tandem. Each motor 32 is typically controlled by a single motor drive 30. However, it is contemplated that a single motor drive 30 may control multiple motors 32 or a single motor 32 be powered by multiple power sections. The network 28 may also join with other devices 31 on the controlled machine or process 36 such as sensors, switches, transducers, and the like that generate inputs for the industrial controller 12 corresponding to a present state of the controlled machine or process or actuators, controlled valves, status indicators, and the like that are controlled by outputs from the industrial controller 12 to achieve desired operation of the controlled machine or process.

A configuration computer 40 may communicate with the processor module 22 and/or the motor drives 30 over the industrial control network 28 or via a dedicated communication channel 42, for example, connecting with the processor module 22. The configuration computer 40 may be a standard desktop or laptop computer and include a keyboard 44, display screen 46, and the like to permit the entry and display of data and the operation of a configuration program by a human operator as will be described below. Optionally, the configuration computer 40 may be an industrial computer with the display 46, user interface, and processing portion integrated into a single housing and configured, for example, to be mounted in a control cabinet.

An external motion planner 200 may also communicate with the processor module 22 or the network module 26 over the industrial control network 28 or via a dedicated communication channel. The external motion planner 200 may be a standard desktop computer, a laptop computer, an industrial computer, or the like and include a processing unit 202, a user interface 204, such as a keyboard, a mouse, a touchpad, a touchscreen, or the like, and a display screen 206 to permit the entry and display of data and the operation of the external motion planner 200 by a human operator as will be described below. According to another embodiment of the invention, the external motion planner 200 may be implemented as a program, such as a dynamic linked library linked to the control program 54 executing in the processor module 22. The dynamic linked library is stored in the memory 50 of the processor module 22 and executed by the processor 48 when called by the control program 54. According to still another embodiment of the invention, a dedicated module 18 may be provided which is inserted in one of the slots of the industrial controller 12. The dedicated module 18 includes memory in which the motion planner routines are stored and a processor to execute the motion planner routines. The dedicate module 18 is configured to communicate via the backplane 16 with the processor module 22.

Referring now to FIG. 2, the processor module 22 includes a processor 48 communicating with a stored memory 50 to execute an operating system program 52 generally controlling the operation of the processor module 22, and a control program 54, the latter describing a desired control of the industrial machinery or processes 36 and typically unique to a given application of the industrial control system 10. The memory 50 may also include data tables (see, for example, hardware tables 88, connection tables 90, tag associations 92, and I/O tables 94 in FIG. 3) as used by the control program 54 and as will be described below.

The processor module 22 also includes an inter-processor interface 51 used to integrate communication between the industrial controller 12 and the external motion planner interface 200. Although illustrated as a separate module, the inter-processor interface 51 may be a dedicated control circuit, may be integrated as a series of instructions stored within the memory 50 and executed by the processor 48 of the processor module 22, or a combination thereof. The inter-processor interface 51 is in communication with the memory 50 and processor 48 to identify motion commands 87 which must be transmitted to the external planner 200 and to receive command signals for the motors 32 from the external planner, which must be integrated with the internal motion planner 100 (see FIG. 3). Operation of the inter-processor interface 51 will be discussed in more detail below.

The processor module 22 may communicate over the backplane or an inter-processor communications bus 16 with the network module 26, the latter including operating circuitry 55 (for example being a processor and a stored program and/or dedicated circuitry such as a field programmable gate array). The operating circuitry 55 may communicate with network interface circuitry 56, the latter providing for execution of low-level electrical protocols on the industrial control network 28.

Similar network interface circuitry 56 may be provided in the motor drives 30 to communicate with an internal motor control processor 58 that may for example execute a servo controller or frequency control algorithm. The internal processor 58 may also communicate with a switching circuit 60 and an I/O circuit 62. This switching circuit 60, for example, may provide for pulse width control or similar outputs to provide direct electrical power driving coils of the motor 32, according to methods well known in the art. The switching circuit 60 generally includes a motor control function determining control parameters for the motor and solid-state devices and drivers that synthesize a voltage, for example one or multiple AC voltage waveforms, that is connected to the motor windings providing power to the motor that controls motor position, torque, speed or the like. The I/O circuits 62 receive feedback signals 64 from sensors 34 on the motors 32 (for example from encoders or the like) and may also receive other inputs, for example, from other machine-based sensors 66, for example, providing registration sensors, limit switches, optical interrupters or the like. The processor 58 may further communicate with a memory 68 holding firmware such as an operating system program 70 or downloaded program elements 72 of control program 54.

As noted above, the configuration computer 40 may be a standard desktop computer having a processor 74 communicating with a memory 76, the latter holding an operating system program 78 as well as various data structures and programs 80, including programs 82 used to configure the industrial control system 10. The computer 40 may also provide for interface circuits communicating between the processor 74, for example, and the industrial network 28 or a separate communication channel 42 to the processor module 22, as well as with the screen 46 and keyboard 44 according to methods well known in the art.

The external motion planner 200 may be a standard desktop computer having a processor 210 communicating with a memory 212, the latter holding an operating system program as well as various data structures and programs 214 for execution on the processor, including programs used to generate motion profiles for one or more axis of the controlled machine or process 36. The external motion planner 200 may also provide for interface circuits communicating between the processor 210, for example, and the industrial network 28 or a separate communication channel to the processor module 22, as well as with the display screen 206 and keyboard 204 according to methods well known in the art.

Referring now to FIG. 3, the memory 50 of the processor module 22 may include data structures 88, 90, 92, 94 and programs, including a copy of the control program 54 to execute on the processor module 22. The data structures may include a hardware table 88 describing capabilities of the various components of the industrial control system 10, for example, including the capabilities of each motor drive 30, the I/O modules 24, and the processor module 22.

The data structures may also include a connection list 90 describing connections between the devices (including, for example, each motor drive 30, the processor module 22, and I/O modules 31) of the industrial control system 10 according to the conventions of connected messaging. Generally each connection represents a pre-allocated portion of the industrial control network 28. These connections are normally based on data entered by the user indicating the originator and target for each connection. The connection list 90 may also describe a desired bandwidth of the connection, for example, defining an update rate of data transmitted over the connection.

The data structures may further include an association list 92 associating input and output tags in the control program 54 (representing variables used in the control program 54 as reflected by data received from sensors and outputs to actuators and motors) to particular hardware elements as assigned by the user. Tags may similarly be defined to identify particular instructions, such as a motion instruction 87, and/or status bits associated with the instruction. Thus, for example, the tags associated with sensors 66 (shown in FIG. 2) may be further associated to a motor drive 30 physically connected to the sensor 66.

The data structures may also include various, functions, tasks or services 96 used to execute the instructions of the control program 54. These functions tasks or services 96 are normally stored in firmware in the processor module 22 and include functions 101 implementing instructions 86 of the control program 54 as well as services called by those functions, for example a motion planner 100 invoked by the functions 101 implementing the motion instructions 87. The motion planner 100 when called by the functions 101 generates a motion profile of a time series of motion data (e.g. positions, velocities, or the like). Other functions, tasks, or services 96 include a communication service 108 handling communication between the controller and the various devices. These functions, tasks, or services 96 are normally part of the native environment of the processor module 22 although they may be updated periodically outside of the normal process of developing control programs.

The control program 54 includes multiple control instructions 86 including motion instructions 87. Generally, the control instructions may be, for example, instructions implementing timers, logic gates, flip-flops, counters, arithmetic operations, and the like expressed in a variety of different languages including relay ladder language, function block language and structured text language, all well known in the art. The control instructions may also include one or more motion instructions 87. The motion instructions 87 may include commands that control movement of a motor 32, for example, between a first and second position under constraints such as maximum velocity, acceleration and jerk; jog instructions causing movement of the motor at a predetermined velocity; and coordinated motion instructions providing movement of a motor 32 in synchrony or at a predetermined ratio or other functional relationship to a second motor as determined by a cam instruction or gear instructions. Generally, each of these instructions implements a motion profile defining a series of motion positions and times generated by a motion planner as will be discussed below.

Figure 5:
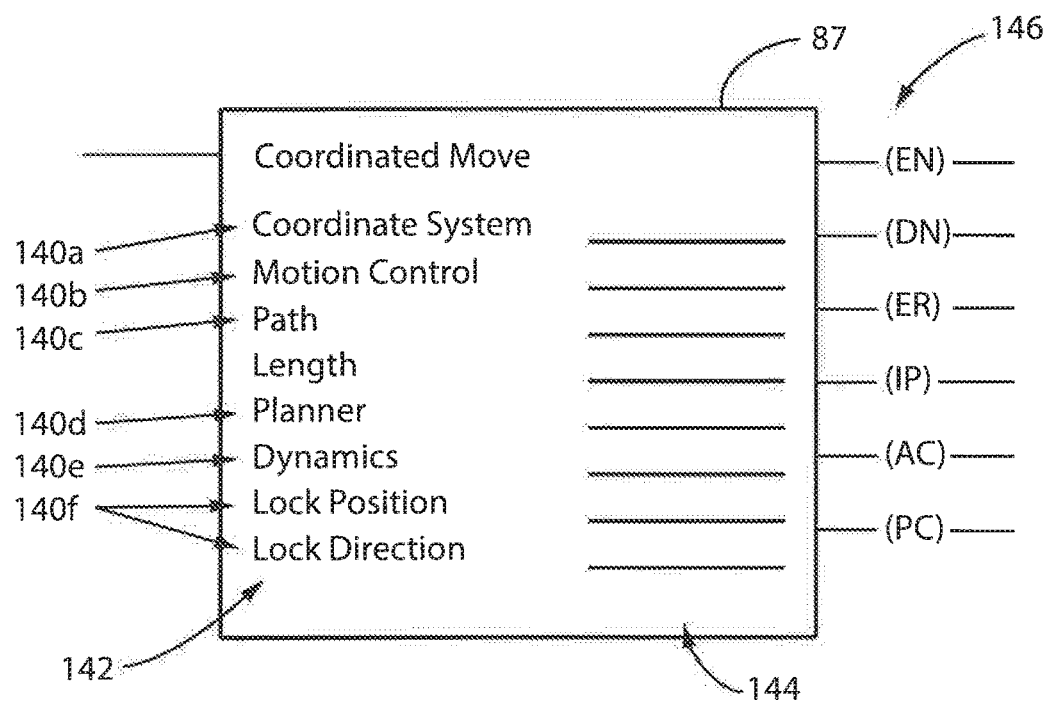
FIG. 5 is an exemplary motion instruction executed by the control program of FIG. 3.
Figure 6:
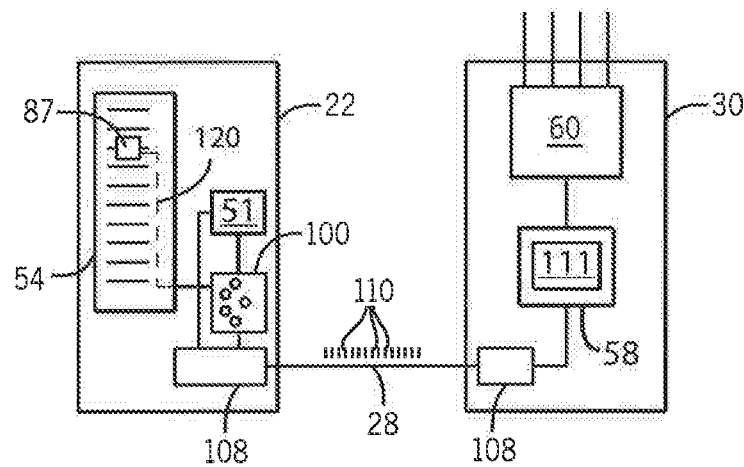
FIG. 6 is a block diagram representation of the industrial controller and one motor drive illustrating an internal motion planner and motion instructions according to one embodiment of the invention.
Figure 7:
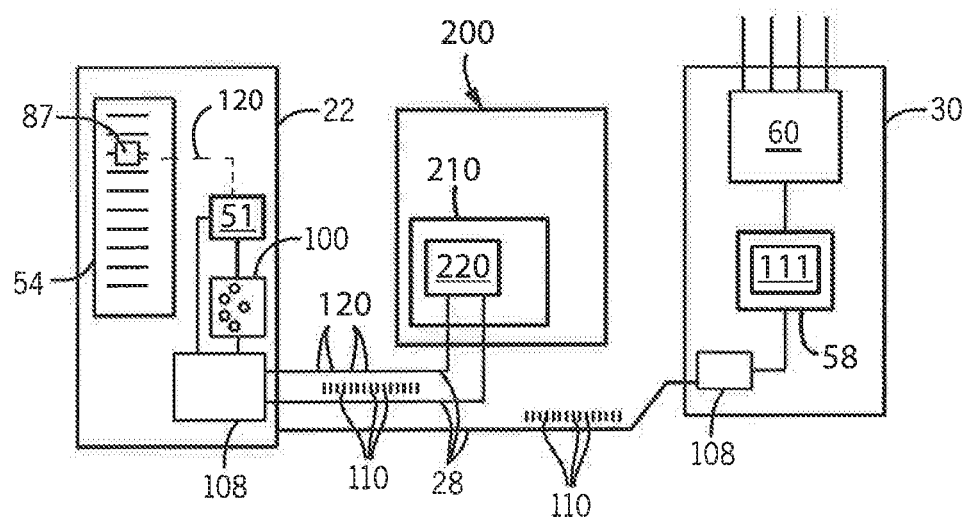
FIG. 7 is a block diagram representation of the industrial controller and one motor drive illustrating an external motion planner and motion instructions according to one embodiment of the invention.

With reference next to FIG. 5, an exemplary motion instruction 87 is illustrated. The exemplary motion instruction 87 is titled a coordinated move. The coordinated move instruction defines a motion profile for at least two axes in the controlled machine or process 36 that move in tandem, causing, for example, a workpiece to travel past a fixture in tandem with a tool on the fixture acting on the workpiece. Similarly, the two or more axes may cause a robotic arm to move in multiple axes between a first position and a second position. The coordinated move instruction includes multiple fields 140 that are configured by a user to define the desired motion. Each field 140 includes a label 142 describing the field and a user interface 144 by which the user sets one or more values for the field 140. It is contemplated that the user interface 144 may take one of a number of different forms. For example, a drop-down menu may provide a user with a list of choices for the field 140. Optionally, the user interface 144 may provide a text box to receive a user-defined setting entered via a keyboard. According to still another option, a selection button or detection of a mouse located over the user interface 144 may launch a separate configuration window in which a number of configuration parameters for the field 140 may be entered.

The fields 140 illustrated in the exemplary motion instruction 87 will be described herein as one exemplary instruction. The exemplary motion instruction 87 will be referred to herein for convenience but is not intended to be limiting. Various other motion instructions with different fields may be provided within the industrial controller 12 to achieve a desired motion without deviating from the scope of the invention. The illustrated motion instruction 87 includes a Coordinate System field 140a in which the multiple axes are to operate. For example, the location of the origin of the coordinate system may be defined with respect to a reference point, such that the subsequent motion commands act on each axes in a known relationship to each other. The Motion Control field 140b is selected to return the status and state for the motion instruction 87. The Path field 140c may be used to define a starting point and an ending point for the desired motion. The Path field 140c may further include details of the motion, for example, whether motion is to occur in the shortest point between the two points, around an exclusion zone, or the like. The Dynamics field 140e includes a structure defining the acceleration rate, deceleration rate, acceleration jerk rate, deceleration jerk rate, maximum speed, and the like. The Lock fields 140f (i.e., Lock Position and Lock Direction) are provided to specify a motion event with respect to a master axis position. The Planner field 140d may be used to define whether the motion instruction is to be executed via an internal motion planner 100 within the industrial controller 12 or an external motion planner 200 in communication with the industrial controller 12. The Planner field 140d may include a structure defining, for example, the type of external motion planner, communication protocol, communication address, data fields, and the like. Further, the Planner field 140d may be used to select one of multiple external motion planners 200 if more than one external motion planner 200 is provided in the controlled machine or process 36. Optionally, it is contemplated, that external motion planner 200 configuration may occur during commissioning where the various information in the structure defining each external motion planner 200 may be accessed outside of the control program and stored in configuration parameters accessed during execution of the control program 54.

The illustrated motion instruction 87 also includes a number of status bits 146. According to the illustrated instruction, the status bits 146 include an enable status bit (EN), a done status bit (DN), an error status bit (ER), an in-progress status bit (IP), an active status bit (AC), and a process complete status bit (PC). The motion instruction 87 is assigned a tag identifying the instruction which is stored in the tag association table 92. Similarly, each of the status bits includes a tag associated with the motion instruction 87 and identifying each status bit, where the tags for the status bits are also stored in the tag association table 92.

Figure 11:
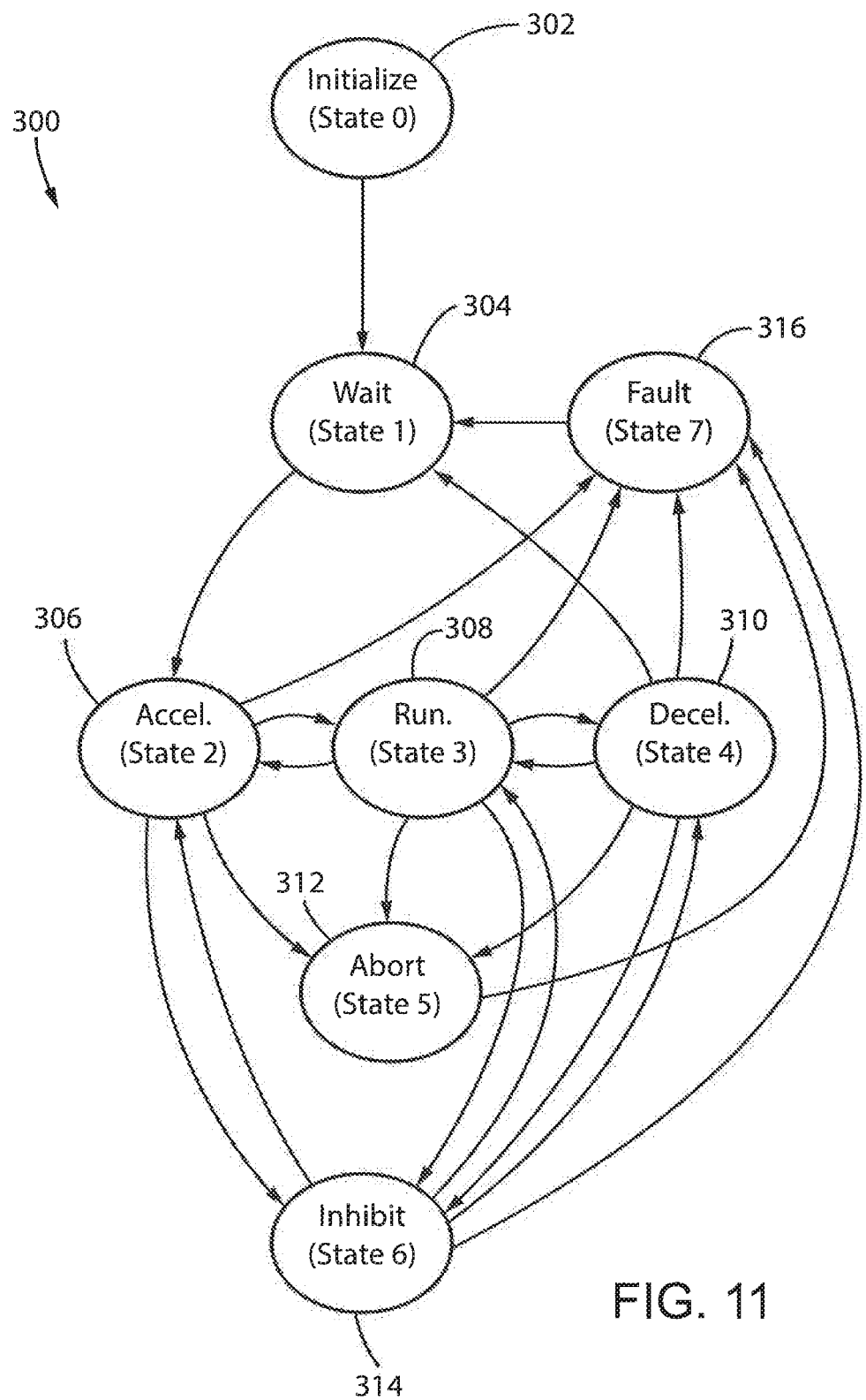
FIG. 11 is a flow diagram illustrating an exemplary state machine implemented in the industrial controller for one axis of the controlled machine or process.

As the motion instruction 87 executes, the industrial controller 12 maintains a motion state machine 300 for each axis corresponding to a current state of operation of the axis. With reference also to FIG. 11, an exemplary motion state machine 300 for one axis is illustrated. The motion state machine 300 includes an initial state (State 0) 302 during which the state machine 300 is initialized such as when power is cycled on the industrial controller 12 or on the motor drive 30 corresponding to that axis. After initialization, the state machine 300 transitions to a wait state (State 1) 304. When the control program 54 executes a motion instruction 87, the state machine 300 may transition through several different states during the commanded motion. For example, a simple motion profile may command an axis, and therefore, the motor 32 associated with the axis, to accelerate from a stopped condition to a constant speed, travel at the constant speed, and decelerate back to a stopped condition. As the motion profile is executed, the state machine 300 transitions through the acceleration state (State 2) 306, run state (State 3) 308, and the deceleration state (State 4). In more complicated motion profiles, the axis may be required to change speed during a move and transition back and forth between the acceleration, run, and/or deceleration states. Upon completion of the commanded motion, the axis returns to the wait state 304.

If a fault occurs during the commanded motion, the state machine 300 transitions to the fault state (State 7) 316. The industrial controller 12 may be configured to execute a fault handler routine for the axis when the state machine enters the fault state 316. The fault handler routine may determine whether an immediate stop, a controlled stop, or a message is posted for an operator while motion is allowed to proceed. If the fault handler routine provides for recovery after the fault, the state machine 300 may return to acceleration state 306, run state 308, or the deceleration state 310. Optionally, if the fault handler routine provides for an immediate or controlled stop, the state machine 300 remains in the fault state 316 until a fault reset occurs, returning the state machine 300 to the wait state 304.

It is another aspect of the invention, that the external motion planner is integrated with the state machine 300 managed by the industrial controller 12. During execution of a first motion instruction 87 by the external motion planner 200, it is contemplated that a second motion instruction 87 may be executed by the control program, where the second motion instruction 87 is intended to be implemented by the internal motion planner 100. It is further contemplated that the industrial controller 12 may receive an input signal at an I/O module 24, where the input signal indicates that the first motion instruction 87 should be altered or overridden. Integration of the external motion planner 200 with the state machine 300 executing on the industrial controller 12 permits subsequent motion commands and/or input signals requesting motion for an axis to be processed while the first motion instruction is still executing, thereby increasing the flexibility of control for each axis.

If the second motion instruction 87 or an input signal requires the first motion instruction to stop, the state machine 300 may enter the abort state (State 5) 312. The abort state 312 may include one or more routines to handle an immediate stop or a controlled stop of the axis. The abort state 312 may cause a revised motion profile to be transmitted to the external motion planner 200 responsive to the input or second motion command such that the immediate or controlled stop is achieved. Such operation may be desired, for example, if the control program 54 detects a problem with a workpiece during execution of the initial move instruction 87. The control program may require that the workpiece be moved to an inspection station rather than continue on its original trajectory and issues a new move instruction 87 to the external planner 200. According to still another example, the industrial controller 12 may receive an input signal indicating an access gate has been opened or a light curtain has been broken, indicating the presence of a technician or operator within a protected region. The industrial controller 12 may issue an immediate or controlled stop, aborting the original motion instruction 87.

Rather than aborting the original motion instruction 87, the state machine 300 may also inhibit the original instruction. An inhibit state (State 6) 314, allows the state machine 300 to temporarily override the original motion instruction 87. A second motion instruction 87 may, for example, command a jog of an axis from a pushbutton or other operator interface. The internal motion planner 100 may generate a series of motion data 110 for the motor drive 30 corresponding to the commanded jog. The internal motion planner 100 may, in turn, inhibit the series of motion data 110 generated by the external motion planner 200 until the jog command is removed. Once the jog command is removed, the internal motion planner 100 may cause the motion profile to the external motion planner 200 to be updated. Alternately, the external motion planner 200 may monitor the position feedback signals from the axis and continually update the series of motion data 110 during the jog command for the axis to reach the original desired location. Upon removal of the jog command, the state machine 300 leaves the inhibit state 314 and returns to the acceleration state 306, run state 308, or deceleration state 310 according to the commanded motion from the external motion planner 200.

The above described state machine 300 is exemplary and is not intended to be limiting. It is contemplated that the state machine 300 may include fewer states or additional states than those illustrated and may similarly include fewer or additional transitions between states according to the application requirements.

Referring now to FIGS. 3-6, during execution of a motion instruction 87 in the control program 54, a call is made by the motion instruction 87 to the function 101 implementing the motion instruction 87 in the hardware of the processor module 22. In the present invention, the functions 101 implementing motion instructions include a decision block 102 to determine whether an external motion planner 200 is present in the industrial control system 10. The presence and type of external motion planner 200 may be entered into configuration parameters and stored in memory 50 during commissioning of the industrial controller 12. Optionally, the presence and type of external motion planner 200 may be defined in a field, such as a Planner field 140d in the motion instruction 87.

As previously indicated, it is contemplated that the external motion planner 200 may take one of several forms. According to a first embodiment, the external motion planner 200 is a separate stand-alone processing device. According to a second embodiment, the external motion planner 200 is embedded within the processor module 22 of the industrial controller 12. According to a third embodiment, the external motion planner 200 is a dedicated module 18 insertable within a slot of the chassis 14 for the industrial controller 12. External means that the motion planner is provided by a third-party other than the manufacturer of the industrial controller rather than physically being located external to the chassis 14 of the industrial controller 12.

Accordingly, the memory 50 of the processor module 12 stores metadata defining the external motion planner 200, the capacity of the external motion planner and how the industrial controller is to communicate with the external motion planner. The metadata defines which embodiment of the external motion planner 200 is present in the controlled system. If the external motion planner is a stand-alone processing unit or implemented within a separate processing unit, the metadata defines, for example, the network 28 by which the industrial controller is connected to the planner, the communication protocol, a network address, and the like. If the external motion planner is embedded within the processor module 22, the metadata defines the function calls required to execute the external motion planner and defines resources of the processor module, such as a memory range, processing time, and the like required by the external motion planner 200. If the external motion planner is inserted as a dedicated module 18 within the chassis, the metadata may identify the backplane by which the module is connected, a dedicated communication interval by which the dedicated module 18 may communicate with the processor module and the like. In addition, the metadata may also define the processing capabilities of the external planner 200 and which of the processing capabilities are to be utilized. For example, the metadata may define the available motion planners present on the external planner and whether the external planner includes an inverse or forward transform module. The metadata may additionally define machine data such as coordinate systems utilized by or geometry present on the machine controlled by the external motion planner. In general, the metadata provides the configuration information required by the industrial controller 12 to communicate with the external planner 200.

If no external motion planner 200 is present, the function 101 proceeds to process block 104 and the internal motion planner 100 is invoked. The motion profile 120 output from the motion instruction 87 is provided to the internal motion planner 100. The internal motion planner 100, based on parameters and the profile 120 passed from the motion instruction 87, processes the motion profile 120 and generates a series of motion data 110 as shown in process block 104. The series of motion data 110 generated by the internal motion planner 100 is combined with any other series of motion data 110 present in the internal motion planner at step 105, as will be discussed in more detail below. The combined series of motion data is sent to the communication service 108 which, in turn, sends the time series of motion data 110 to the motor drive 30 over the industrial network 28. This combined time series of motion data 110 is sent at a coarse update interval which may be on the order of milliseconds and is received by a corresponding communication service 108 at the motor drive 30 which provides it to the processor 58. The processor 58 includes a fine interpolator 111 which interpolates a high-resolution motion profile from the motion data 110 having a fine update interval on the order of a hundred microseconds. Data from the fine interpolator 111 is provided to control algorithms within the motor drive 30 to generate reference and/or gating signals for the switching circuit 60 which, as described above may utilize solid-state devices and drivers for synthesizing the necessary waveforms driving the motor 32.

Referring now to FIGS. 3-5 and 7, if at decision block 102, it is determined that an external motion planer 200 is present in the industrial control system, the function 101 sends the motion profile 120 to the external motion planner 200 via the inter-processor interface 51, as shown in block 103. The motion profile 120 represents generally the same data that was sent to the internal motion planner 100, discussed with respect to FIG. 6 above. The external motion planner 200, based on parameters and the profile 120 passed from the motion instruction 87, processes the motion profile 120 and generates a series of motion data 110 according to the motion planning routines executing on the external planner as shown in process block 106. The series of motion data 110 generated by the external motion planner 200 is transmitted back to the industrial controller 12 and, more specifically, to the internal motion planner 100. The internal motion planner 100 utilizes the series of motion data 110 from the external planner 200 as one of multiple potential sources of motion commands to each axis and combines this series of motion data 110 with any additional series of motion data 110 present for an axis at an adder 152 (see FIG. 9) as will be discussed in more detail below. The processor module 22, in turn, transmits the combined series of motion data 110 output from the internal motion planner 100 to the motor drive(s) 30 corresponding to the axis (axes) for which motion is desired over the industrial network 28.

The inter-processor interface 51 is in communication with the memory 50 of the processor module 22 and retrieves one or more configuration parameters corresponding to the external planner 200 connected to the industrial controller 12. The configuration parameters may define, for example, a communication protocol for the external planner 200 or other data unique to and required by the external planner to generate commands for the motors 32. The inter-processor interface 51 is also in communication with the communication service 108 to generate data packets, including the motion profile 120 and any additional information which is sent via the communication service 108 to the external motion planner 200. The inter-processor interface 51 provides the series of motion data 110 received from the external planner 200 to the internal motion planner 100.

The present invention provides a seamless integration of the external motion planner 200 with the industrial controller. It is contemplated that the external motion planner 200 may be configured to receive the motion profile 120 at any one of multiple stages along the process of converting the motion profile 120 to the series of motion data 110. Further, the external motion planner 200 may be configured to execute a portion of or all of the steps required to convert the motion profile 120 to the series of motion data 110. The external motion planner 200 may be configured to return the series of motion data 110 or to return other data according to which conversion steps are executed in the motion planner 200. According to another embodiment of the invention, the external motion planner 200 may work in cooperation with the internal motion planner where both planners generate a series of motion data 110 either at the same time, at different times, or a combination thereof. The motion data commands may be combined in an adder and transmitted to a motor drive. According to yet another embodiment of the invention, the external motion planner 200 may be a third-party motion planner application embedded in and executing on the configuration computer 40 or on the processor module 22.

Figure 9:
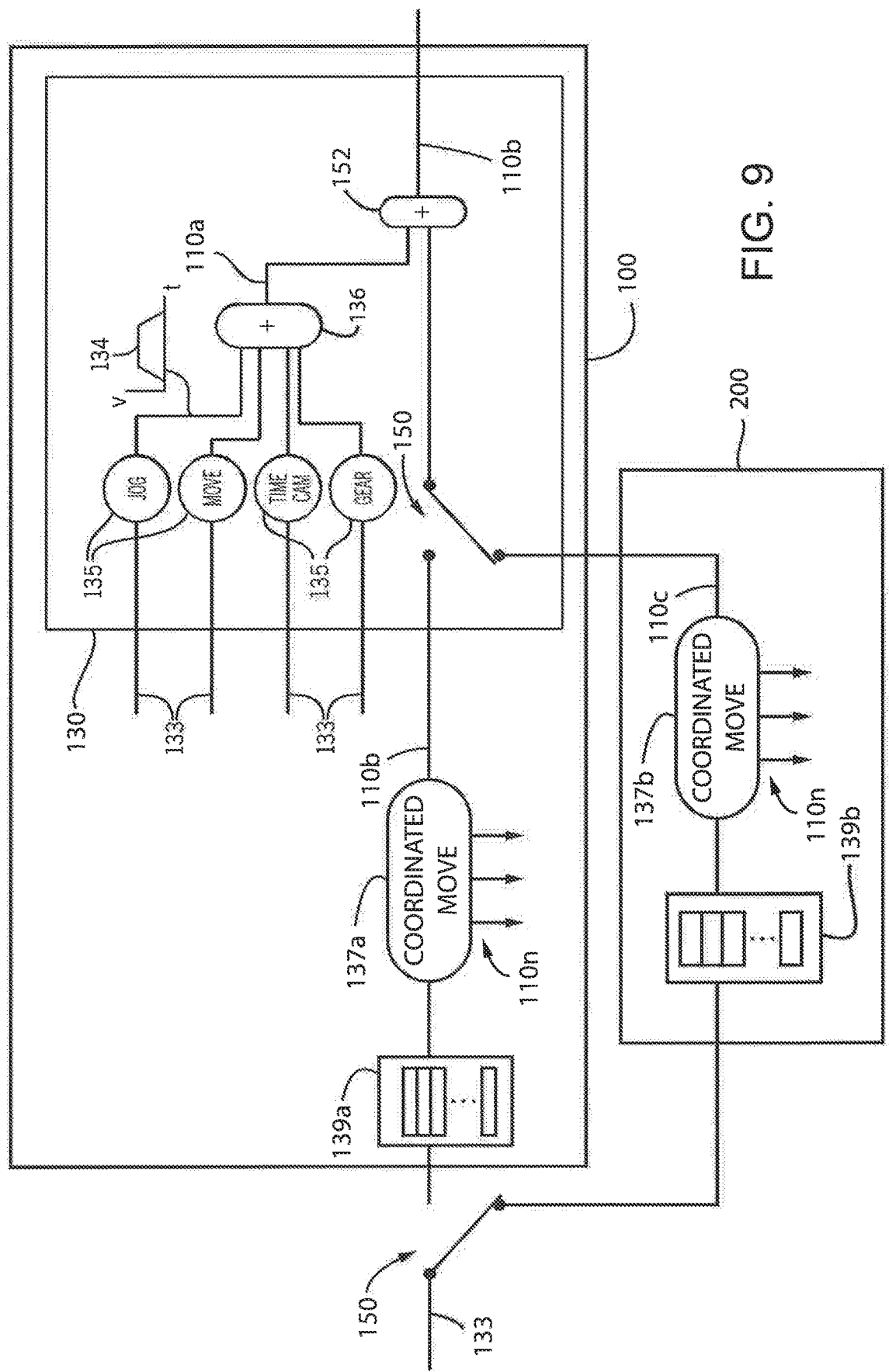
FIG. 9 is a functional block diagram of an industrial control system including both an internal motion planner and an external motion planner according to one embodiment of the invention.

Referring now to FIG. 9, a first embodiment of the external motion planner 200 integrated with the internal motion planner 100 is illustrated. In the illustrated embodiment, it is contemplated that the external motion planner 100 executes in the same coordinate system as the internal motion planner 100. For example, both the internal and external motion planners are configured to operate in the cartesian coordinate system and control motors 32 causing motion in the X, Y, and Z directions. The internal motion planner 100 may be executed on the processor module 22 or on a dedicated module inserted into one of the slots of the industrial controller 12. The internal motion planner 100 incorporates all the programming necessary to generate the time series motion data 110 from the parameters of various motion instructions 87. The parameters from the motion instructions are illustrated in FIG. 9 as being inputs 133 to an axis node 130. Generally, each motion instruction 87 may invoke a separate motion generator 135 associated with that instruction 87 and execute a motion profile 134 describing the desired motion as a function of time. As illustrated, the motion instructions 87 may define a jog function, a move function, a timed cam function, or a gear function 135. The motion profiles 134 for the different instructions are added together by a first adder 136 and output as a first time series of motion data 110a in one of a number of forms generally including: a motor position command, a motor velocity command, and a motor acceleration command.

For a portion of the motion instructions 87 it may be desirable to have an external motion planner 200 generate the motion profile describing the desired motion as a function of time. A switch 150 is defined within the industrial controller 12, where the switch 150 may be a configuration parameter stored in memory 50. The switch 150 may be configured during commissioning for every motion instruction of a particular type, or types, or may be defined on a per instruction basis with, for example, a Planner field 140d, in the motion instruction 87. According to the illustrated embodiment, the coordinated motion instruction is selectively implemented in either the internal motion planner 100 or the external motion planner 200. The switch 150 routes the input settings 133 for the coordinated motion instruction to the appropriate motion planner. As previously discussed, the function 101 illustrated in FIG. 4, determines whether the coordinated move instruction is transmitted to the external motion planner 200 or executed within the internal motion planner 100.

With reference again to FIG. 9, each coordinated move instruction from the control program 54 is first provided to an instruction queue 139. The internal motion planner 100 includes a first instruction queue 139a and the external motion planner 100 includes a second instruction queue 139b. As the planner completes one instruction, the next instruction waiting in the queue 139 is passed to the coordinated move function 137. The internal motion planner 100 includes a first coordinated motion routine 137*a* and the external motion planner 200 includes a second coordinated motion routine 137*b*. Either planner 100, 200 is configured to generate time series motion data output from the respective coordinated motion routine 137*a*, 137*0b* where a second time series of motion data 110*b* is generated by the internal motion planner 100 when the internal motion planner 100 processes the coordinated move and a third time series of motion data 110*c* is generated by the external motion planner 200 when the external motion planner 200 processes the coordinated move. According to the illustrated embodiment, a single axis node 130 within the internal motion planner is shown. It is contemplated that additional axis nodes will be included for each axis to be controlled by within the internal motion planner 100. A coordinated motion command 137 contemplates motion in at least two controlled axes be coordinated with each other. Each of the coordinated move routines 137*a*, 137*b* include additional time series of motion data 110*n* sequences illustrated as being output from the routine. Each additional time series of motion data output corresponds to an additional axis of motion to be controlled and would be provided as an input to the axis node corresponding to that axis.

The decision block 102 shown in FIG. 4 generates an output that controls the switch 150 and selects either the second time series of motion data 110*b* generated by the internal motion planner 100 or the third time series of motion data 110*c* generated by the external motion planner. The selected time series of motion data is added to the output of the first adder 136 at a second adder 152 to generate a combined time series of motion data 110*d* output to each of the axis corresponding to the axis node 130.

It is understood that execution of the internal motion planner 100 and the external motion planner 200 must be synchronized. Each motion planner is configured to execute at a periodic update rate to generate the time series of motion data for a motor drive. The internal motion planner may execute, for example, at a two hundred fifty microsecond (250 μsec) update rate to output motion data to each motor drive 30 and the external motion planner may execute at a two, four, or eight millisecond (2, 4, or 8 msec) update rate. The time periods at which each planner executes is synchronized such that the time series of motion data generated for each axis is similarly synchronized. It is further contemplated that the internal motion planner may include an interpolator to generate intermediate time series of motion data at the faster update rate of the internal motion planner.

It is understood that the embodiment illustrated in FIG. 9 is exemplary and is not intended to be limiting. It is contemplated that various functions illustrated within FIG. 9 may occur in different sequences without deviating from the scope of the invention. For example, a single switch 150 may be located in advance of the coordinated move block shown in each planner, where only one planner generates a time series of motion data in response to each profile. Similarly, the output of the coordinated move routine 137 may be provided to the first adder 136 and a single adder implemented rather than using first and second adders 136, 152. It is further contemplated that the motion instructions executed by the external motion planner 200 are not limited to the coordinated move instruction. The external motion planner 200 may, for example, execute a Time Cam function and an additional switch 150 may be provided in advance of or subsequent to the Time Cam function for the internal motion planner 100 to select the output of the Time Cam function from either the internal or external motion planner to generate time series of motion data output corresponding to the selected Time Cam function for summation at the adder 136.

Figure 10:
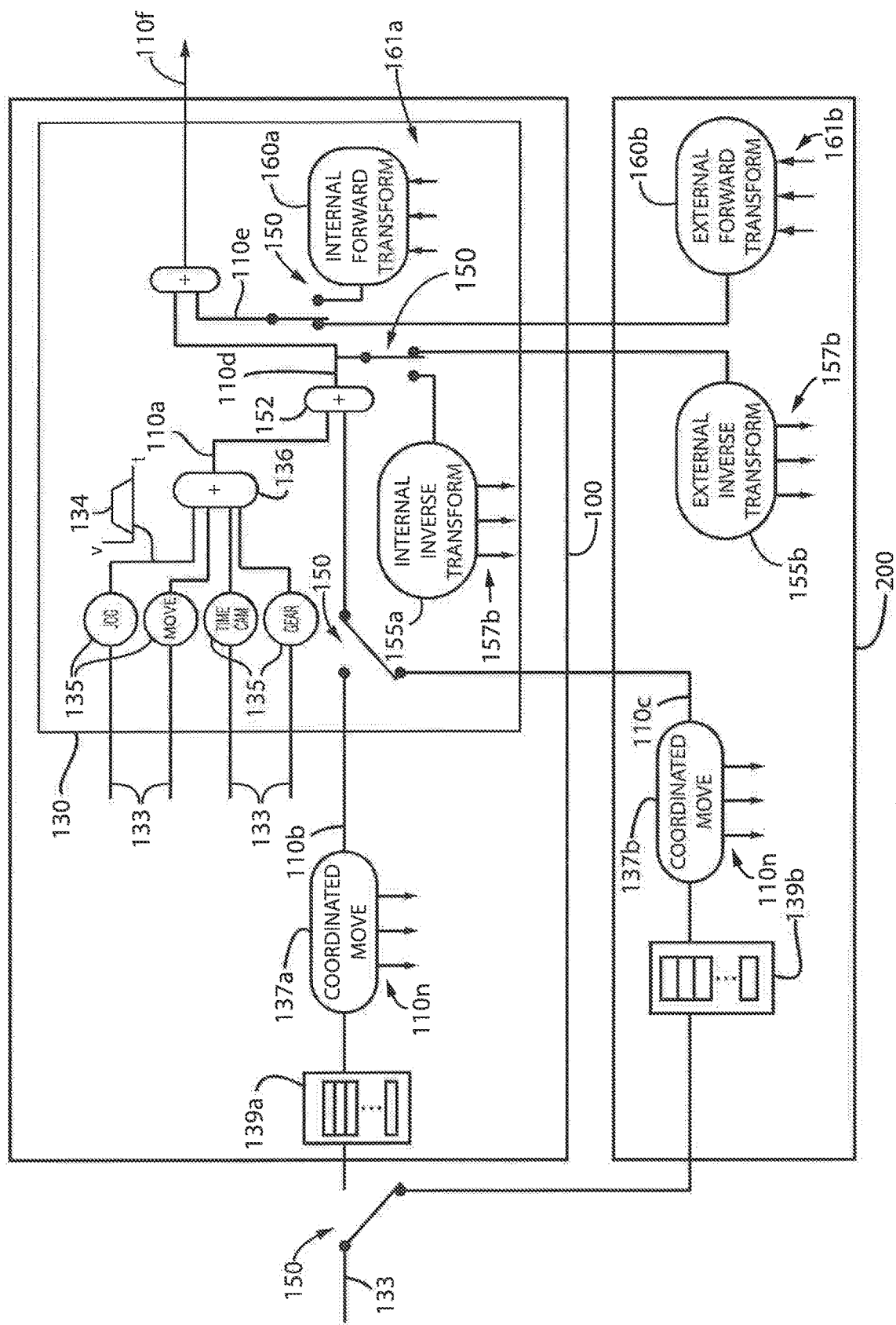
FIG. 10 is a functional block diagram of an industrial control system including both an internal motion planner and an external motion planner according to another embodiment of the invention.
Figure 12:
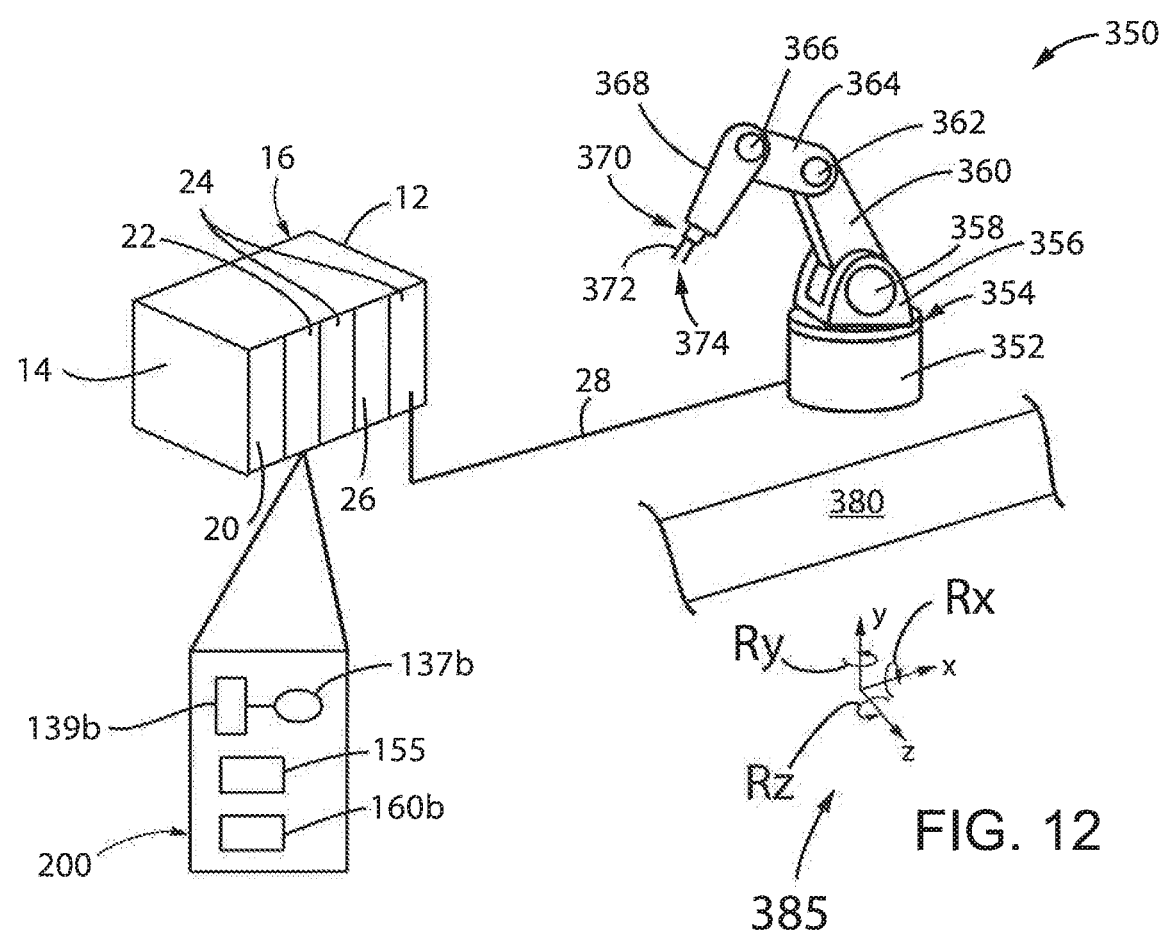
FIG. 12 is a simplified perspective view of an exemplary industrial control system having an industrial controller communicating with a robotic actuator over a communication network and further illustrating an external motion planner incorporated within the processor module of the industrial controller according to one embodiment of the invention.

Referring next to FIG. 10, a second embodiment of the external motion planner 200 integrated with the internal motion planner 100 is illustrated. In this embodiment, it is contemplated that the motion commands may need to execute on multiple coordinate systems. With reference, for example, to FIG. 12, a robot 350 is controlled by the industrial controller 12 and is controlled to execute on product travelling along a conveyor 380 adjacent to the robot 350. An exemplary Cartesian Coordinate System 385 is defined with respect to the conveyor 380 and to product traveling along the conveyor. The Cartesian Coordinate System 385 includes an X, Y, and Z axis. Also illustrated are rotational coordinates Rx, Ry, and Rz, which indicate a desired rotation of an end effector 372 of the robot 350.

The robot 350, however, cannot move directly in any of these axes. The robot 350 includes a base 352 and a first joint 354 located between the base 352 and a lower support 356 of the robot. The first joint 354 allows the robot 350 to rotate in a plane generally parallel to the floor on which the robot 350 is located. A lower arm 360 extends upwards from the lower support 356 and pivots around a second joint 358. A middle arm 364 extends beyond the lower arm and pivots around a third joint 362. An upper arm 368 extends beyond the middle arm 364 and pivots around a fourth joint 366. A gripper 372 serves as an end effector (i.e., a device attached to the end of the robot arm) for the robot 350. The gripper 372 may be rotated about a fifth joint 370 in a plane generally parallel to the end of the upper arm 368. As may be seen, controlling a location and desired rotation of the end effector of the robot 350 within the Cartesian Coordinate System 385 requires coordinated motion of each of the five joints on the robot 350.

Referring again to FIG. 10, it is contemplated that each of the internal and external motion planners 100, 200 may include transforms to covert motion commands between a Cartesian Coordinate System 385 and a joint coordinate system. With reference also to FIG. 12, it is contemplated that the external motion planner 200 is a library incorporated in and executing on the processor module 22 of the industrial controller 12. The external motion planner 200 includes motion routines that generate command data to each of the joint axes of the robot 350 based on a desired motion profile provided in a motion instruction 87. The motion command 37 may, for example, command a tool tip 374 of the end effector 372 to travel between a first set of X, Y, and Z coordinates with a first rotational orientation (Rx, Ry, Rz) and a second set of X, Y, and Z coordinates with a second rotational orientation (Rx, Ry, Rz). The motion instruction 87 indicates that the external planner 200 is to generate the desired time series of motion commands 110 to control operation of each joint on the robot. The external planner 200 of FIG. 10 operates in a manner similar to that discussed above with respect to FIG. 9 to generate the third time series of motion commands 110*c*. Any additional motion instructions supported by the internal planner resulting in output at the corresponding motion generator 135 is combined at the second adder to generate the combined time series of motion commands 110*d*. This combined time series of motion commands is supplied to an inverse transform 155 to convert a commanded motion in the Cartesian Coordinate System 385 to motion in a joint axis for the robot 350. Both the internal motion planner 100 and the external motion planner 200 may include transforms. The internal motion planner 100 has an internal inverse transform 155*a* and the external motion planner 200 has the external inverse transform 155b. As illustrated, the switch 150 directed use of the internal or external motion planner similarly selects the desired inverse transform. However, it is contemplated that separate switches may be provided for selection of the motion planner, the inverse transform, and the forward transform within either the internal or external motion planners. For discussion, the external inverse transform 155 in the external motion planner is used to transform the series of time motion commands 157 for a particular axis in the Cartesian Coordinate System to motion commands for each of the different axes in the joint axis coordinate system. The inverse transform 155 will receive the combined time series of motion data 110d for the X axis as an input and will execute the required transform to generate motion data that will control each of the robot joints and will result in the tool tip 374 to arrive at the desired X axis coordinate. For example, for the tool tip 374 to move in a straight line along the X axis, the third joint 362 may need to raise the middle arm 364 upward, while at the same time the fourth joint 366 may need to cause the upper arm 368 to rotate downward toward the middle arm. The coordinated motion of the two joints can result in the tool tip traveling in a straight line along the X axis toward the base 352 of the robot. Thus, for the exemplary motion command the inverse transform converts a motion command in the X axis to a motion command in the third joint axis and in the fourth joint axis.

A separate joint axis node is provided in the internal motion planner for each joint axis, and each joint axis node is configured similar to the axis node illustrated in FIG. 10. However, rather than receiving motion profiles in a Cartesian axis, each of the motion profiles provided to the adders in a joint axis node are generated in the joint axis reference frame. One of the adders 136 or 152 in the joint axis nodes receives as an input, the output from the inverse transform of each axis in the Cartesian Coordinate System that requires some motion by the particular joint to travel along the respective axis. Each of the time series of motion commands received based on the desired motion within each axis of the Cartesian Coordinate System 385 is summed within the joint axis node to generate an appropriate series of motion commands for each joint axis.

Each of the internal and external motion planners 100, 200 also include a respective forward transform 160a, 160b to convert commands 161a, 161b from the joint axes to the corresponding Cartesian axis. The forward transform works similarly to the inverse transform described above but converts commands generated in a joint axis to motion in one or more Cartesian axes. The switch 150 as previously discussed may selectively connect either the internal forward transform 160a or the external forward transform 160b to a third adder 170. The third adder adds the time series of motion commands 110e output from the selected forward transform to the combined time series of motion commands 110d from the second adder to generate a final time series of motion commands 110f output to the motor drive 30 to control operation of the corresponding axis.

Referring again to FIG. 5, the motion instruction 87 includes a number of status bits 146. When the internal motion planner 100 processes the motion profile, the status bits 146 are updated according to the present operation of the axis or axes to be controlled by the motion instruction 87. For example, when the motor drive 30 controlling operation of the motor 32 corresponding to each controlled axis is enabled, the enable status bit (EN) is set. When the motor drive 30 is providing an output voltage to the motor 32 to control operation of the motor 32, the active status bit (AC) is set. These status bits may be utilized within other rungs of the same task or within other tasks of the control program 54 by reading the value associated with each tag corresponding to the status bit to perform additional steps or to initiate other actions within the controlled machine or process 36.

Figure 8:
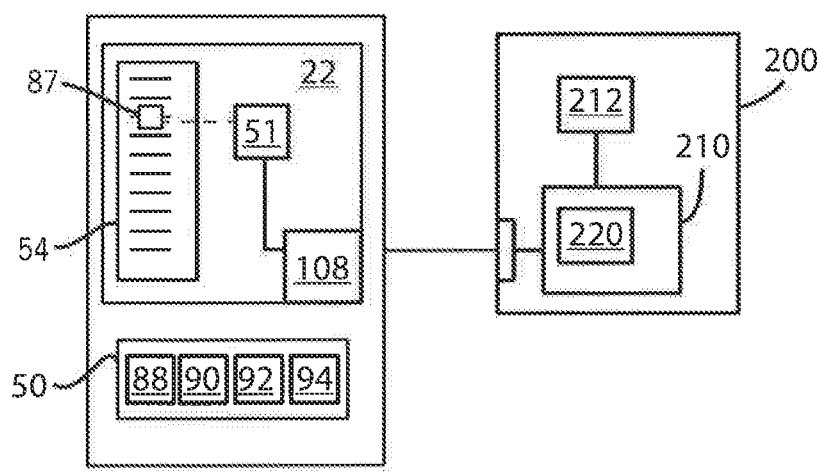
FIG. 8 is a block diagram representation of an exemplary communication interface between the industrial controller and an external motion planner according to one embodiment of the invention.

For further integration of the external motion planner 200 with the industrial controller 12, the status bits 146 for the motion instruction 87 are similarly set when the external motion planner 200 is processing the motion profile. With reference next to FIG. 8, the external motion planner 200 executes one or more motion control routines 220 on the processor 210 in the external motion planner 200. The motion control routines generate similar status bits to those set in the motion instruction 87. In addition to transmitting the time series of motion data 110 generated by the external motion planner 200, various status bits are similarly transmitted from the external motion planner 200 to the industrial controller.

The inter-processor interface 51 receives the status bits generated by the external motion planner 200 and sets the corresponding status bits for the motion instruction 87. As previously discussed, a tag is assigned to each of the status bits 146 for the motion instruction 87 and stored in a tag association table 92. The tag association table 92 may further include a tag associated with each of the status bits generated by the external motion planner 200 and/or an association between the status bits generated by the external motion planner 200 and the status bits for the motion instruction 87. As the external planner 200 transmits the status bits generated by the external motion control routines 220, the inter-processor interface 51 identifies the corresponding status bit for the motion instruction 87 via the definitions in the tag association table 92. The inter-processor interface 51 then sets or resets the status bits 146 for the motion instruction according to the values of the corresponding status bits generated by the external motion planner 200.

By streaming the time series of motion data 110 and the status bits from the external motion planner 200 through the processor 48 of the industrial controller 12, the motion instruction 87 executes within the control program 54 as if the internal motion planner 100 rather than the external motion planner 200 were processing the motion profile. The industrial controller 12 is able to integrate the external motion control routines 220 within the state machine 300 for each axis and to have complete knowledge of the controlled axis throughout execution of the desired motion profile. The industrial controller 12 has knowledge, for example, of the current position, the commanded position, and the current operating status of the axis. In contrast, prior art systems only passed the move command to the external motion planner 200 and waited either for a predefined time in which the move was expected to complete or for a response from the external motion planner indicating that the motion was complete. The integration of the external motion planner further allows other systems, such as safety systems, jog functions, leader/follower functions, gearing functions, axis offsets, and the like that are already implemented within the industrial controller 12 to be readily applied to the external motion planner 200. These internal functions are executed by the internal motion planner 100, generating a first time series of motion data for each axis, and the motion profile is processed by the external motion planner 200, generating a second time series of motion data, where the two time series of motion data are summed together to result in a modified, or combined, time series of motion data to be output to the motor drive 30 for each axis.

According to another aspect of the invention, the industrial controller 12 may connect to various types of external motion planners 200. A first external motion planner 200 may be a robotic motion planner configured to control one or more robots. The robotic motion planner may utilize the Robotic Operating System (ROS) with a defined set of open source software libraries. A second external motion planner 200 may be a third-party proprietary motion planner executing with a set of custom software libraries. Still other motion planners may be motion simulation packages, such as MATLAB®, MATHCAD®, or the like, where a model of the system may be entered in the simulation package and the simulation package may be configured to output a time series of motion commands to achieve a desired motion. Each type of motion planner may require different data packets and/or protocols for communication. Further, each type of motion planner may generate different status bits or provide status bits or words in differing formats. As previously discussed, the requirements of the various communication protocols and/or the data and/or status bits returned from the external motion planners 200 may be stored in memory 50 of the processor module. The inter-processor interface is in communication with the memory 50 to generate and receive data packets from each external motion planner 200 according to the specific requirements. Additionally, multiple external motion planners 200 may be provided, where each external motion planner interprets a motion profile for one or more axes and generates the corresponding series of motion data commands for the corresponding axes.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. An industrial controller for coordinating motion of a plurality of axes on a controlled machine or process, the industrial controller comprising:
    a memory device storing a plurality of instructions;
    a processor configured to execute the plurality of instructions;
    a control program executing in real time on the processor, wherein the control program includes at least one motion instruction and wherein the motion instruction defines a motion profile;
    an inter-processor interface configured to communicate the motion profile between the industrial controller and an external motion planner during execution of the control program and to receive from the external motion planner a series of motion data for controlling operation of at least one motor drive, wherein each motor drive corresponds to one of the plurality of axes on the controlled machine or process;
    a motion state machine defining a plurality of states for coordinated motion between the at least one motor drive and the controlled machine or process; and
    an internal motion planner configured to select one of the plurality of states in the motion state machine as a function of the series of motion data and of at least one additional command corresponding to a desired operation of the controlled machine or process.

2. The industrial controller of claim 1 wherein:
    the control program includes at least one additional motion instruction,
    the additional motion instruction defines a second motion profile for the internal motion planner,
    the internal motion planner generates a second series of motion data for controlling operation of the at least one motor drive responsive to the second motion profile,
    the internal motion planner combines the series of motion data from the external motion planner with the second series of motion data, and
    the internal motion planner outputs a combined series of motion data to the at least one motor drive.

3. The industrial controller of claim 1, further comprising at least one input module configured to receive an input signal from the controlled machine or process, wherein the internal motion planner is further configured to modify the series of motion data from the external motion planner prior to outputting a modified series of motion data to the at least one motor drive responsive to receiving the input signal.

4. The industrial controller of claim 1 wherein the motion instruction includes a plurality of status bits and wherein a data table stored in the memory device defines a tag associated with each of the plurality of status bits.

5. The industrial controller of claim 4, wherein:
the external motion planner generates at least one of the plurality of status bits for the motion instruction and transmits the at least one of the plurality of status bits to the industrial controller with the series of motion data, and
the inter-processor interface identifies the tag associated with each of the plurality of status bits for the motion instruction and sets the corresponding status bit for the motion instruction to a value set in the at least one of the plurality of status bits received from the external motion planner.

6. The industrial controller of claim 1, wherein the external motion planner is selected from one of a robot motion planner and a motion simulator.

7. The industrial controller of claim 1 wherein the external motion planner is selected from one of a module inserted into a slot on the industrial controller and a planner module stored on the memory device and configured to execute on the processor.

8. The industrial controller of claim 1, wherein:
the motion profile includes a coordinated motion profile for at least two axes on the controlled machine or process, and
the external motion planner generates at least two series of motion data, where each series of motion data corresponds to one of the at least two axes.

9. A method of coordinating motion of a plurality of axes on a controlled machine or process, the method comprising the steps of:
executing a motion instruction from a control program, where the control program is executing in real time on a processor of an industrial controller;
reading a motion profile defined in the motion instruction with an inter-processor interface in the industrial controller;
transmitting the motion profile from the industrial controller to an external motion planner during execution of the control program;
receiving from the external motion planner at the inter-processor interface a series of motion data for controlling at least one motor drive, where each motor drive corresponds to one of the plurality of axes on the controlled machine or process; and
selecting with an internal motion planner one of a plurality of states defined for coordinated motion between the at least one motor drive and the controlled machine or process, wherein the internal motion planner is configured to execute on the industrial controller.

10. The method of claim 9, further comprising the steps of:
executing at least one additional motion instruction from the control program, wherein the additional motion instruction defines a second motion profile;
generating a second series of motion data for controlling operation of the at least one motor drive with the internal motion planner, wherein the second series of motion data corresponds to the second motion profile,
combining the series of motion data from the eternal motion planner with the second series of motion data in the internal motion planner, and
outputting a combined series of motion data from the internal motion planner to the at least one motor drive.

11. The method of claim 9 further comprising the steps of:
receiving an input signal from the controlled machine or process with at least one input module operatively connected to the industrial controller;
modifying the series of motion data received from the external motion planner with the internal motion planner; and
outputting a modified series of motion data from the internal motion planner to the at least one motor drive responsive to receiving the input signal.

12. The method of claim 9 wherein the motion instruction includes a plurality of status bits and wherein a data table stored in the memory device defines a tag associated with each of the plurality of status bits.

13. The method of claim 12 further comprising the steps of:
receiving from the external motion planner at least one of the plurality of status bits for the motion instruction;
identifying the tag associated with each of the plurality of status bits received from the external motion planner; and
setting the corresponding status bit for the motion instruction to a value set in the at least one of the plurality of status bits received from the external motion planner.

14. A system for coordinating motion of a plurality of axes on a controlled machine or process, the system comprising:
at least one motor drive wherein each motor drive corresponds to one of the plurality of axes on the controlled machine or process;
an external motion planner, including:
a memory configured to store a plurality of instructions to generate a series of motion data; and
a processor configured to execute the plurality of instructions;
an industrial controller, including:
a memory device configured to store a control program;
a processor configured to execute the control program, wherein the control program includes at least one motion instruction and wherein the motion instruction defines a motion profile;
an inter-processor interface configured to communicate the motion profile between the industrial controller and the external motion planner during execution of the control program and to receive from the external motion planner the series of motion data during execution of the control program;
a motion state machine defining a plurality of states for coordinated motion between the at least one motor drive and the controlled machine or process; and
an internal motion planner configured to select one of the plurality of states in the motion state machine as a function of the series of motion data and of at least one additional command corresponding to a desired operation of the controlled machine or process.

15. The system of claim 14 wherein:
the control program includes at least one additional motion instruction,
the additional motion instruction defines a second motion profile for the internal motion planner,
the internal motion planner generates a second series of motion data for controlling operation of the at least one motor drive responsive to the second motion profile,
the internal motion planner combines the series of motion data from the external motion planner with the second series of motion data, and
the internal motion planner outputs a combined series of motion data to the at least one motor drive.

16. The system of claim 14, Wherein the industrial controller farther includes at least one input module configured to receive an input signal from the controlled machine or process and wherein the internal motion planner is further configured to modify the series of motion data from the external motion planner prior to outputting a modified series of motion data to the at least one motor drive responsive to receiving the input signal.

17. The system of claim 14 wherein:
the motion instruction includes a plurality of status bits,
a data table stored in the memory device defines a tag associated with each of the plurality of status bits,
the external motion planner generates at least one of the plurality of status bits for the motion instruction and transmits the at least one of the plurality of status bits to the industrial controller with the series of motion data, and
the inter-processor interface identifies the tag associated with each of the plurality of status bits for the motion instruction and sets the corresponding status bit for the motion instruction to a value set in the at least one of the plurality of status bits received from the external motion planner.

18. The system of claim 14, wherein the external motion planner is selected from one of a robot motion planner and a motion simulator.

19. The system of claim 14 wherein the external motion planner is selected from one of a module inserted into a slot on the industrial controller and a planner module stored on the memory device of the industrial controller and configured to execute on the processor of the industrial controller.

* * * * *